United States Patent
Endo et al.

(10) Patent No.: US 7,817,446 B2
(45) Date of Patent: Oct. 19, 2010

(54) SWITCHING POWER SUPPLY CIRCUIT

(75) Inventors: Naoto Endo, Tama (JP); Hitoshi Shima, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 372 days.

(21) Appl. No.: 11/998,137

(22) Filed: Nov. 28, 2007

(65) Prior Publication Data

US 2008/0129266 A1    Jun. 5, 2008

(30) Foreign Application Priority Data

Nov. 30, 2006    (JP) .............................. 2006-322823

(51) Int. Cl.
*H02M 3/335*    (2006.01)

(52) U.S. Cl. ...................................... 363/21.12; 363/39

(58) Field of Classification Search ............. 363/16–20, 363/21.03, 21.12, 84, 89, 127, 132; 323/224, 323/271–274, 282–288, 22; 315/224, 194, 315/307

See application file for complete search history.

(56) References Cited

U.S. PATENT DOCUMENTS 4,866,367 A * 9/1989 Ridley et al. ................. 323/287
7,254,046 B2 * 8/2007 Kawasaki et al. ........ 363/21.12

FOREIGN PATENT DOCUMENTS

| JP | 7-236271 A | 9/1995 |
| JP | 3254199 B2 | 11/2001 |
| JP | 2003-284328 A | 10/2003 |
| JP | 2004-297943 A | 10/2004 |

* cited by examiner

*Primary Examiner*—Rajnikant B Patel
(74) *Attorney, Agent, or Firm*—Holtz, Holtz, Goodman & Chick, PC

(57) ABSTRACT

Disclosed a switching power supply circuit of current resonance type including: a switching element; an LC resonance circuit to resonate current flowing through the switching element; and a detection circuit to perform a detection associated with an output current amount on the basis of an operation timing of the switching element and a voltage under resonating operation of the LC resonance circuit.

11 Claims, 8 Drawing Sheets

PATTERN A
IN CASE OF I3
<0[A] WHEN VHS IS TURN ON
(OUTPUT 0A OR BACK FLOW)

PATTERN B
IN CASE OF I3
≒ 0[A] WHEN VHS IS TURN ON
(SMALL OUTPUT CURRENT)

PATTERN C
IN CASE OF I3
> 0[A] WHEN VHS IS TURNED ON
(LARGE OUTPUT CURRENT)

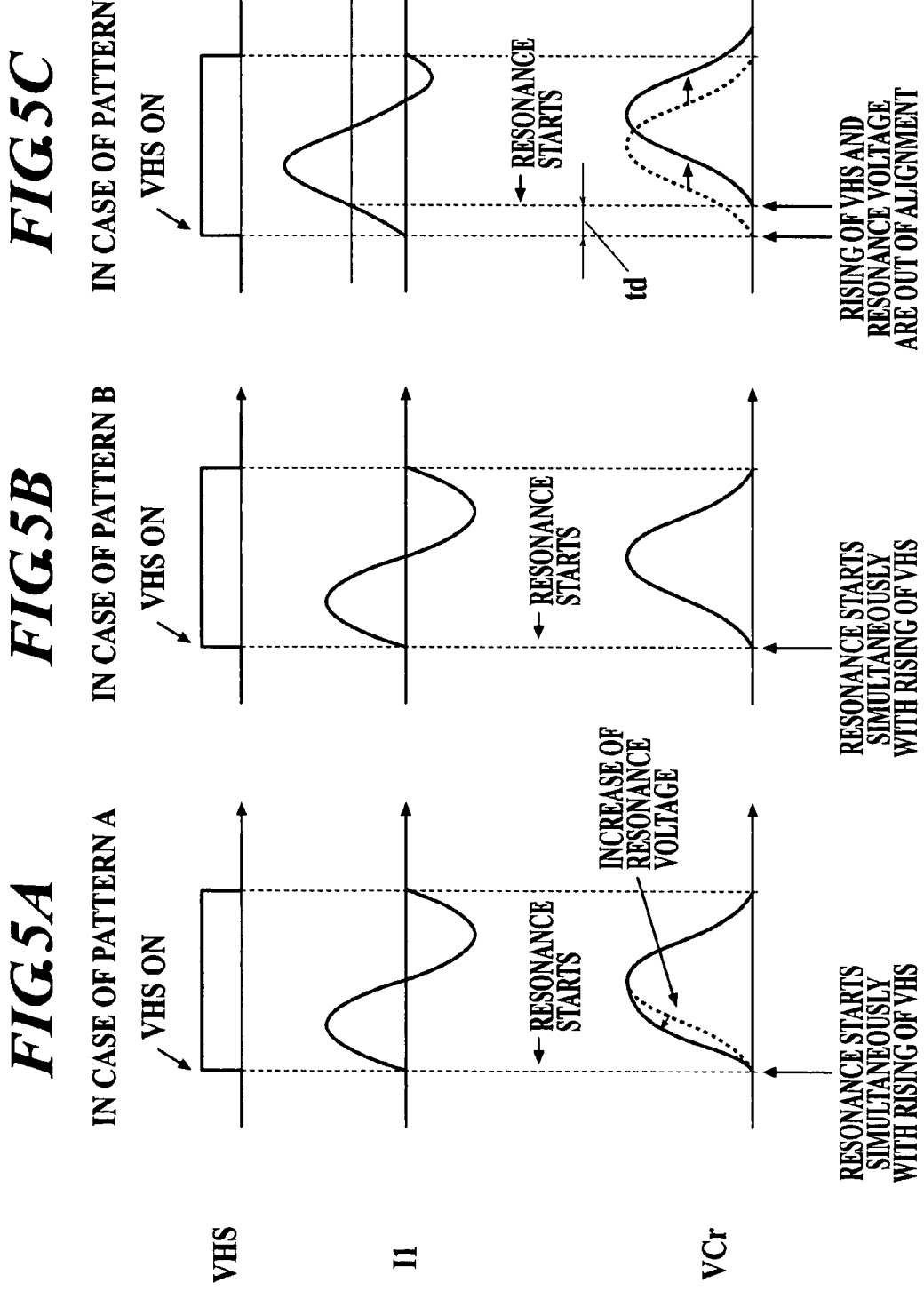

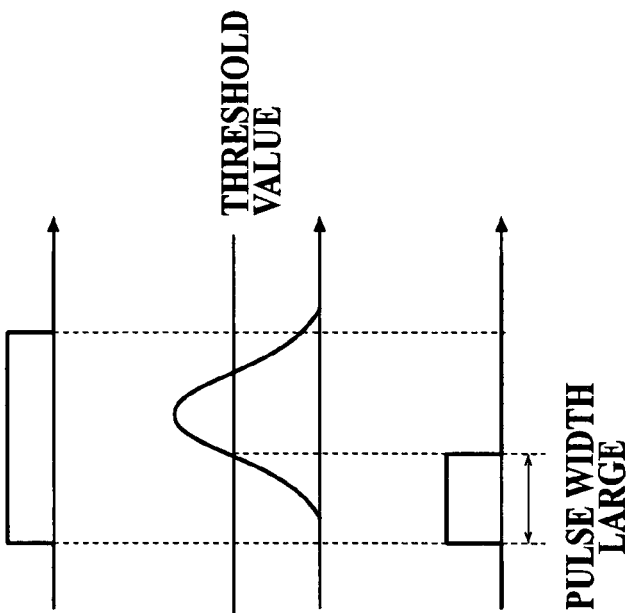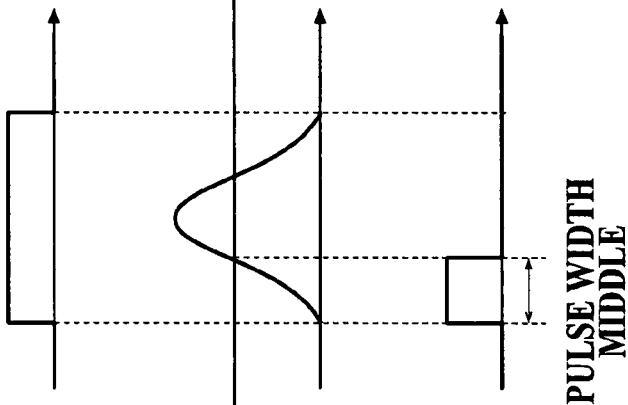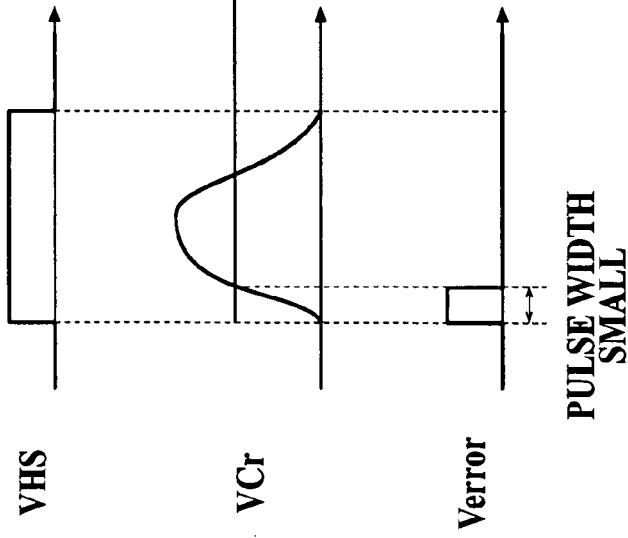

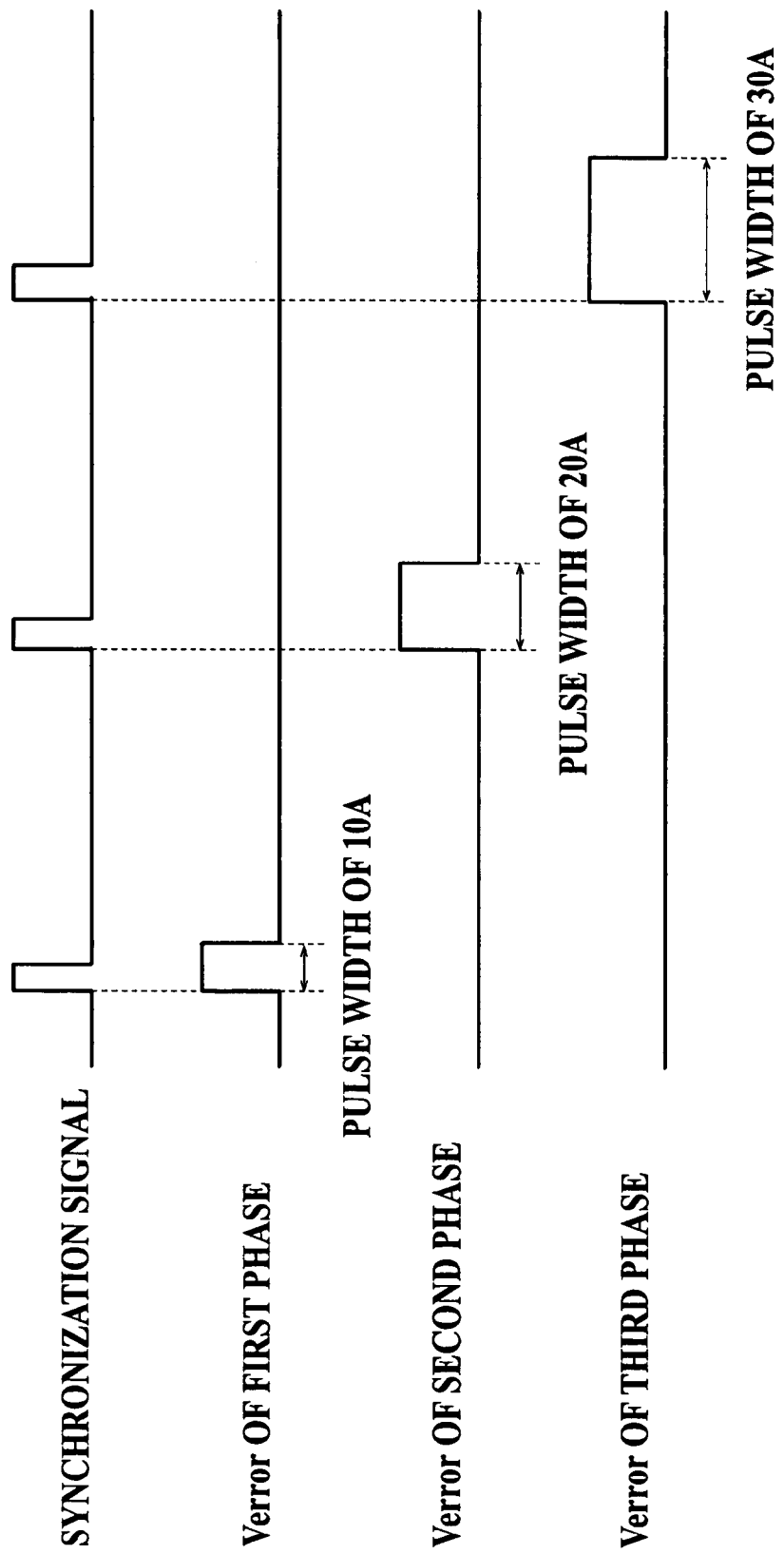

SWITCHING POWER SUPPLY CIRCUIT

BACKGROUND OF THE INVENTION

1. Field of the Invention

The present invention relates to a technique for detecting output current in a current resonance type switching power supply circuit.

2. Description of Related Art

In some cases, detection of output current is required in a DC-DC converter for the purpose of overcurrent protection and current mode control. Here, according to the current mode control, not only an output voltage, but also a current detection signal of an output inductor is fed back to perform switching control, thereby improving the power factor, enhancing the line regulation, etc.

Furthermore, detection of output current is also required in a multi-phase type power supply circuit to adjust current balance of respective converters in some cases. According to the multi-phase type, a plurality of DC-DC converters are operated in parallel to one another and respective outputs thereof are added to one another while shifting the output phase every converter, thereby obtaining a stable output having a low ripple.

The following disclosures are known as a system for detecting the output current in the DC-DC converter. For example, Japanese Patent Application Laid-Open Publications No. 2004-297943 discloses a system in which a current detecting resistor R is connected to an output current pathway and a voltage occurring across this resistor is detected as shown in FIG. 8A. Furthermore, Japanese Patent No. 3,254,199 discloses a system in which a resistor R2 and a capacitor C are connected in parallel with an output coil Lo and output current is detected on the basis of the voltage of the capacitor C by using the resistance component R1 of the output coil Lo as shown in FIG. 8B. Still furthermore, Japanese Patent Application Laid-Open Publications No. 2003-284328 discloses a system in which output current is detected on the basis of the drain-source voltage under ON-operation of the transistor SW2 by using the ON-resistance of a synchronous rectification transistor SW2 as shown in FIG. 8C.

Furthermore, Japanese Patent Application Laid-Open Publications No. 7-236271 discloses a system in which the output current is detected from the peak value of the resonance voltage of an LC resonance circuit, because there is a correlation between the peak voltage of a resonance voltage and output current in a voltage resonance type switching power supply device.

The resonance type switching power supply circuit has an advantage that a switching loss and a switching noise are reduced, and comparing the voltage resonance type and the current resonance type, they have their peculiar advantages respectively. Therefore, it is required in some cases to detect the output current and execute various kinds of control based on the detection of the output current while adopting the current resonance type switching power supply circuit.

The output current can be also detected by applying the systems of FIGS. 8A to 8C in the current resonance type switching power supply circuit. However, the system of FIG. 8A has a disadvantage that a large loss occurs in the current detecting resistor R. Furthermore, the system of FIG. 8B has a disadvantage that the number of circuit elements is increased for detecting current and also has a problem that it is impossible to detect accurate current unless a temperature compensation circuit is added because the resistance component R1 of the coil Lo has a relatively large temperature characteristic.

The system of FIG. 8C has a problem that a temperature compensation circuit is required to perform accurate current detection because the ON-resistance of FET has a temperature characteristic, and further the systems of FIGS. 8B and 8C have a problem that a very high-precision detecting circuit is required for detecting a small voltage generated by small resistance.

Unlike the voltage resonance type circuit disclosed in Japanese Patent Application Laid-Open Publications No. 7-236271, the current resonance type switching power supply circuit does not have such a simple correlation that the output current amount is proportional to the peak value of the resonance voltage, and thus it is impossible to detect the output current by applying the technique disclosed in Japanese Patent Application Laid-Open Publications No. 7-236271.

SUMMARY OF THE INVENTION

The present invention has an object to make it possible to, in a current resonance type switching power supply circuit, detect accurate output current by merely adding a voltage detection circuit and a simple logic circuit without requiring to additionally provide a current detecting resistor, a capacitor, etc. to the power supply circuit.

Furthermore, the present invention has another object to provide a current resonance type switching power supply circuit that can perform various kinds of control based on output current by the detection of the output current as described above.

According to a first aspect of the present invention, in order to attain the above objects, there is provided a switching power supply circuit (11) of current resonance type, including a switching element (SWH: FIG. 2), an LC resonance circuit (Lr, Cr) to resonate current flowing through the switching element, and a detection circuit (20) for performing detection associated with an output current amount on the basis of an operation timing of the switching element (SWH) and a voltage under the resonating operation of the LC resonance circuit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 4A-4C are diagrams showing a current passage immediately after the high side switch is turned on;

FIGS. 5A-5C are waveform diagrams showing the relationship of the driving pulse of the high side switch, resonance current and a capacitor voltage;

FIGS. 6A-6C are waveform diagrams showing the operation of a current detection circuit for generating a current value pulse signal from the driving pulse of the high side switch and the capacitor voltage;

FIG. 7 is a waveform diagram showing an example of the control using the current value pulse signal in the multi-phase type power supply device of FIG. 1.

DETAILED DESCRIPTION OF THE INVENTION

Hereinafter, an embodiment of the present invention will be described.

Figure 1:
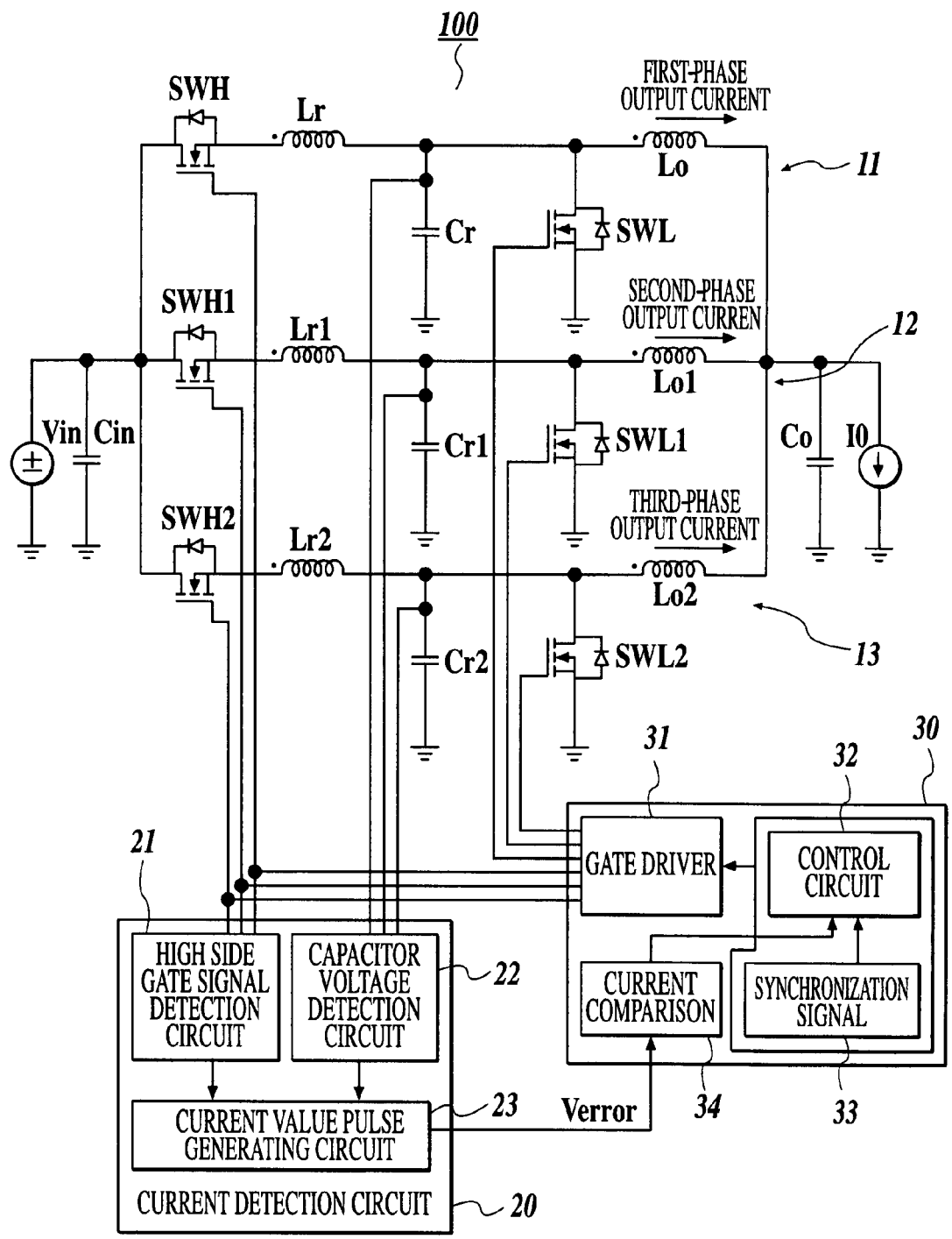
FIG. 1 is a diagram showing the construction of a multi-phase type power supply device according to an embodiment of the present invention.

FIG. 1 is a diagram showing the construction of a power supply device according to an embodiment to which the present invention is applied.

A power supply device 100 according to this embodiment is a multi-phase type power supply circuit in which a plurality of switching power supply circuits 11 to 13 are arranged in parallel and the respective output current values thereof are added to obtain single output current Io. The power supply device 100 comprises the plural current resonance type switching power supply circuits 11 to 13, a control block 30 to control the operation of these power supply circuits and a current detection circuit 20 to detect the output current of each of the power supply circuits 11 to 13. In the multi-phase type, the plural switching power supply circuits 11 to 13 are subjected to switching control so that the output phases thereof are different from one another, whereby a stable output having a low ripple can be obtained as a whole.

The power supply circuits 11 to 13 are current resonance type/step-down type DC-DC converters having the same circuit construction. Even in the case of the same circuit construction, a relatively large difference occurs in the outputs of the respective power supply circuits 11 to 13 due to dispersion of constants of the circuit elements. Therefore, it is required to adjust the output current.

The control block 30 comprises a synchronization signal generating circuit 33 to generate a reference timing for operating the respective power supply circuits 11 to 13, a control circuit 32 to execute switching control of the respective power supply circuits 11 to 13, a gate driver 31 to drive the gate terminals of high side switches SWH to SWH2 and low side switches SWL to SWL2 of the respective power supply circuits 11 to 13, a current comparison circuit 34 that receives a signal from the current detection circuit 20 and compares currents among the power supply circuits 11 to 13, etc. Although not shown in the figures, an error amplifier to detect an output voltage, a detection circuit to detect OFF-timing of the resonance switch, etc. are provided, and these detection signals are input to the control circuit 32.

The control circuit 32 executes switching control on the respective power supply circuits 11 to 13 mainly under the PFM control (Pulse Frequency Modulation). Furthermore, the control circuit 32 receives the comparison result of the output current of the respective power supply circuits 11 to 13 from the current comparison circuit 34, and varies the pattern of the switching frequency so that the frequency of the switching driving is reduced for a current circuit having large output current and increased for a current circuit having small output current. Accordingly, the output current of the respective power supply circuits 11 to 13 is controlled to be uniform among them.

The current detection circuit 20 comprises a high side gate signal detection circuit 21 to monitor an output signal of the gate driver 31, a capacitor voltage detection circuit 22 to monitor the voltages of the resonant capacitors Cr to Cr2 of the respective power supply circuits 11 to 13, a current value pulse generating circuit 23 to generate current value pulses Verror representing the output current amounts of the respective power supply circuits 11 to 13 on the basis of the outputs of the detection circuits 21 and 22.

Figure 2:
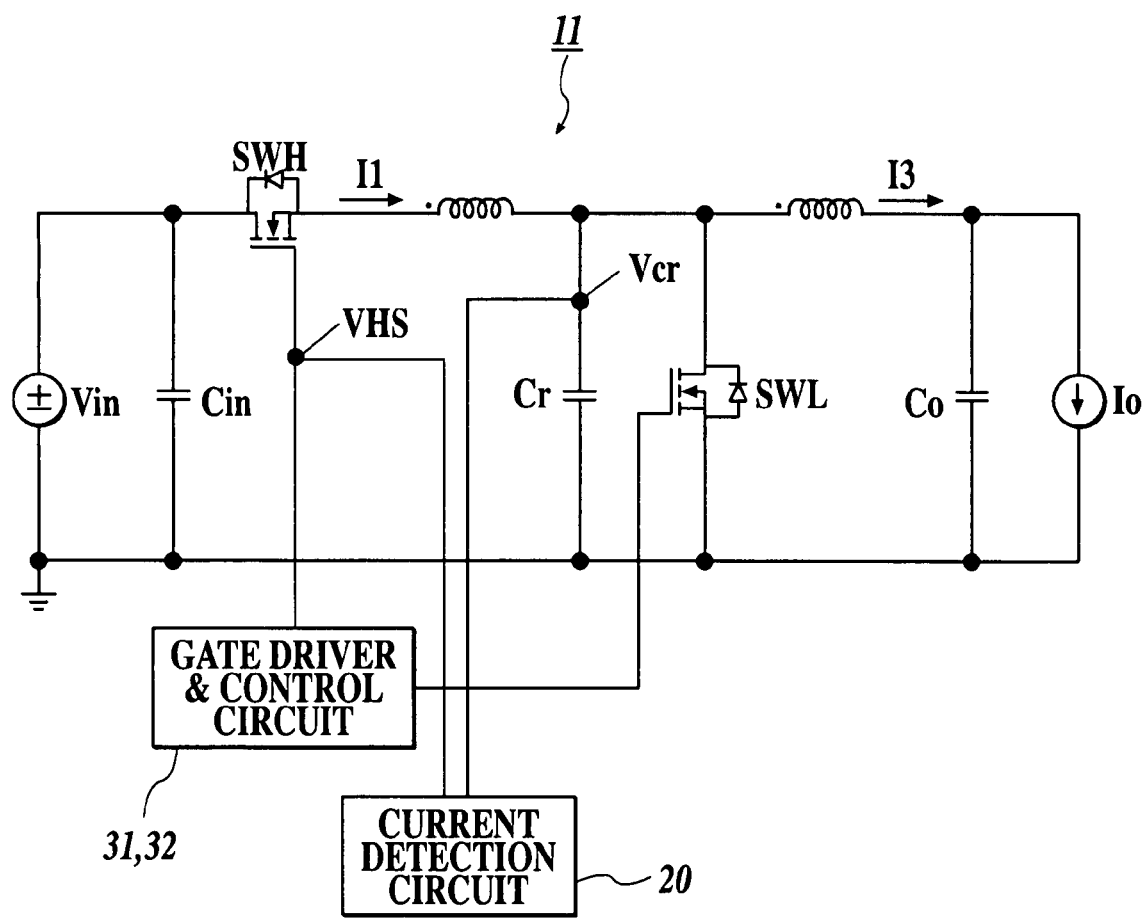
FIG. 2 is a circuit diagram showing one switching power supply circuit of FIG. 1.

FIG. 2 shows one switching power supply 11 of FIG. 1.

As described above, the switching power supply circuits 11 to 13 are step-down type DC-DC converters each of which receives a DC input voltage Vin and then outputs a predetermined DC voltage, and a current resonance type resonating switch is used as a switch for inputting the input voltage Vin.

The switching power supply circuit 11 comprises an input capacitor Cin connected between input terminals, a high side switch SWH having MOSFET, etc. to input and interrupt the input voltage Vin, a resonant inductor Lr and a resonant capacitor Cr to resonate the current of the high side switch SWH, a reactor Lo to accumulate power in accordance with input of the input voltage Vin, a synchronous rectification low side switch SWL to supply current to the reactor Lo during the OFF period of the high side switch SWH, an output capacitor Co connected between output terminals, etc. The input capacitor Cin and the output capacitor Co are common to the respective switching power supply circuits 11 to 13.

The resonant inductor Lr and the resonant capacitor Cr constitute an LC resonance circuit to vary the current flowing through the high side switch SWH substantially in a sinusoidal shape. The resonant inductor Lr is connected in series to the high side switch SWH so that the same current as the current flowing through the high side switch SWH flows in the resonant inductor Lr, and the resonant capacitor Cr is connected between the terminal at the opposite side of the resonant inductor Lr to the high side switch SWH and a reference potential (for example, the ground) so as to be charged by the current flowing through the resonant inductor Lr. Another connection style may be adopted for the LC resonance circuit insofar as it can resonate the current flowing through the high side switch SWH. For example, one end of the resonant capacitor Cr is not connected to the ground, but may be connected to another reference potential point such as the input voltage terminal or the like.

The resonance frequency of the LC resonance circuit (resonant inductor Lr and the resonance capacitor Cr) is set to be larger than the switching frequency of the power supply circuit 11, and the resonance current the amount of which corresponds to one period flows by one ON/OFF operation of the high side switch SWH.

Figure 3A:
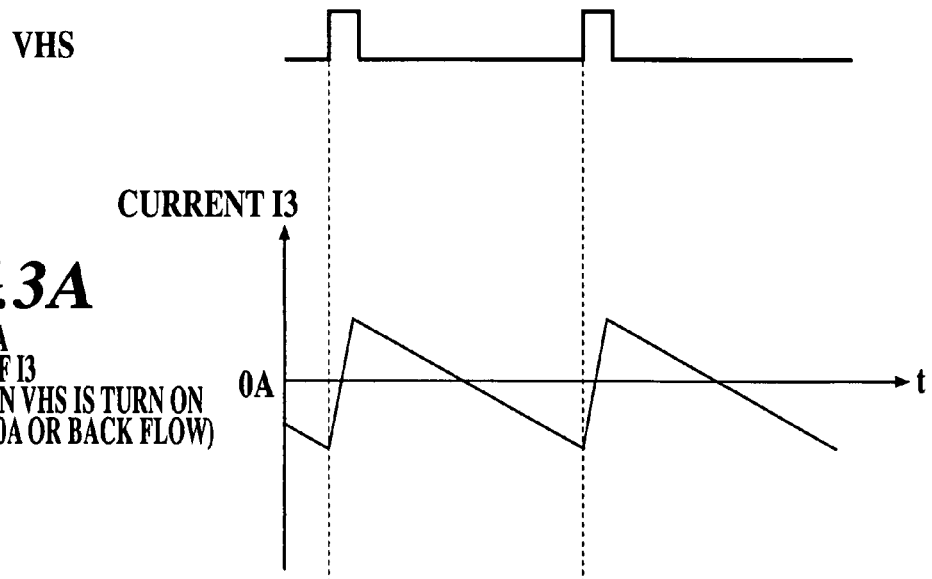
FIGS. 3A-3C are waveform diagrams showing the relationship between a driving pulse of a high side switch and output current.
Figure 3B:
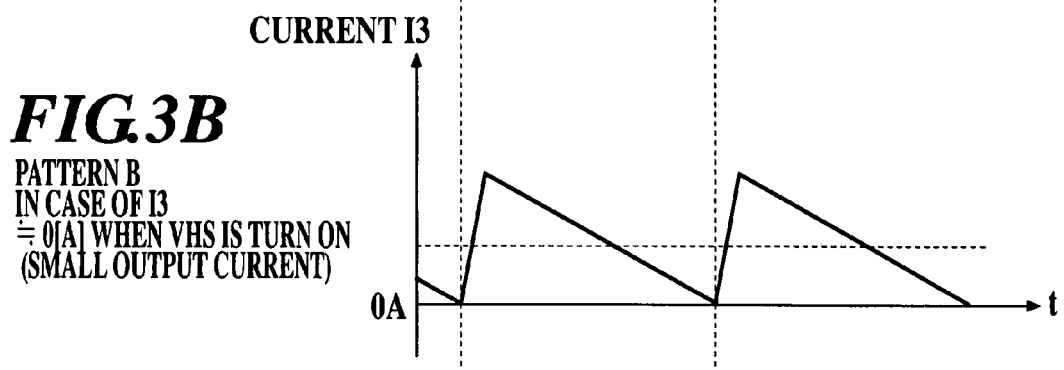
Figure 3C:
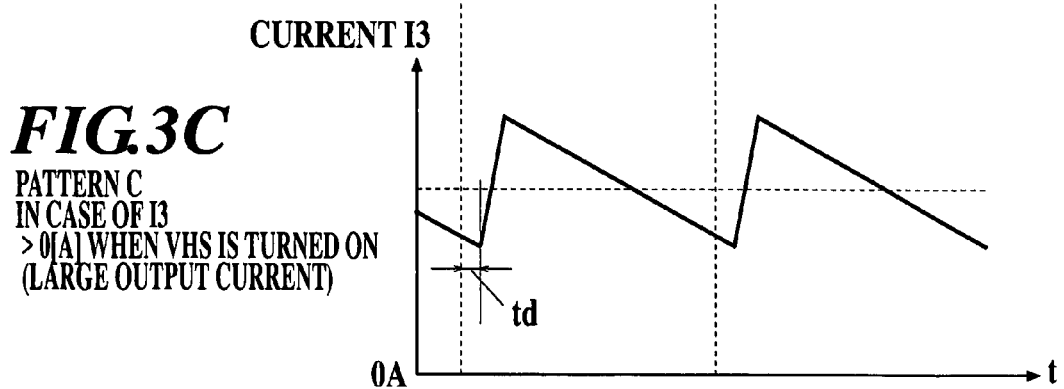
Figure 4A:
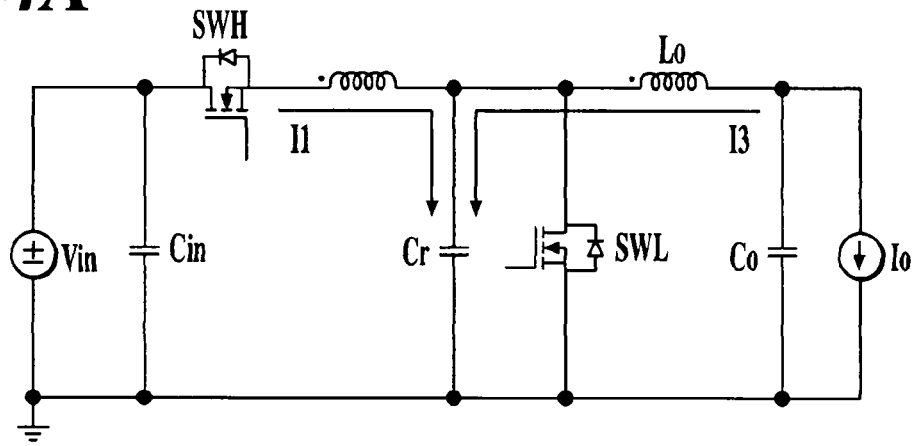
Figure 4B:
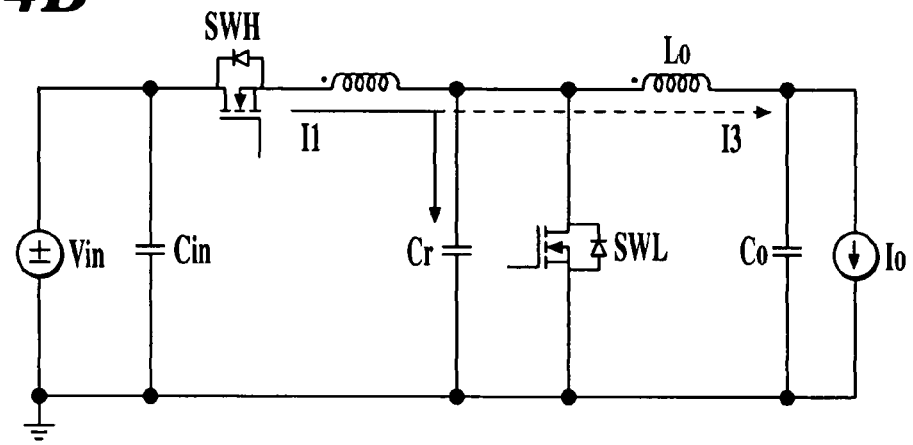
Figure 4C:
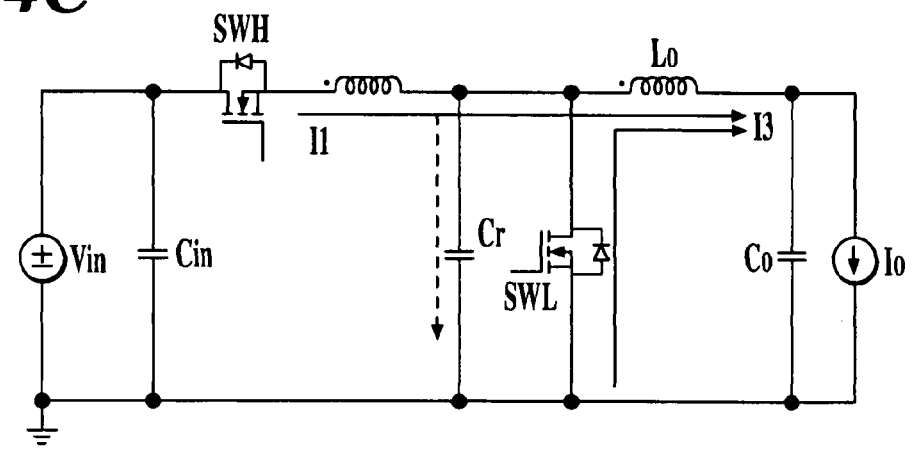
Figure 8A:
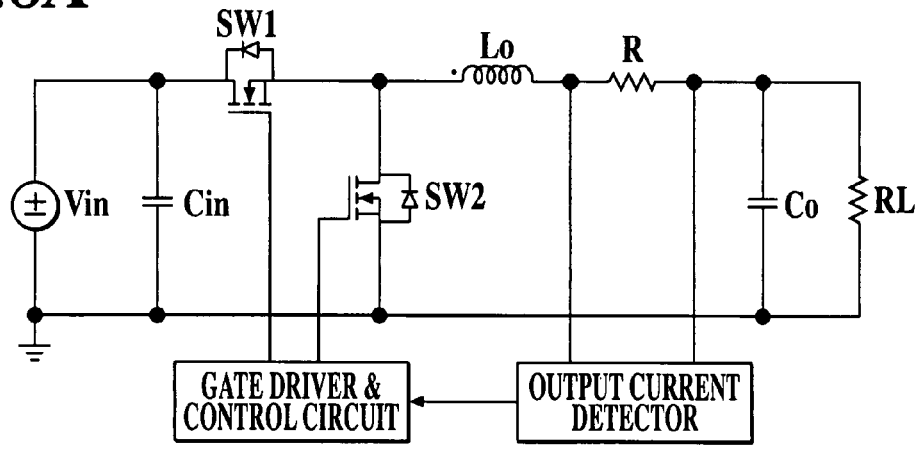
FIGS. 8A-8C are circuit diagrams showing an example of a conventional output current detecting method.
Figure 8B:
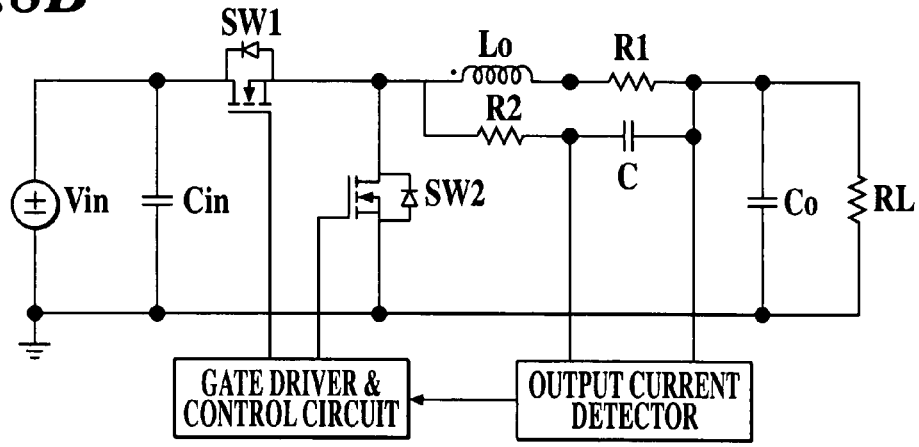
Figure 8C:
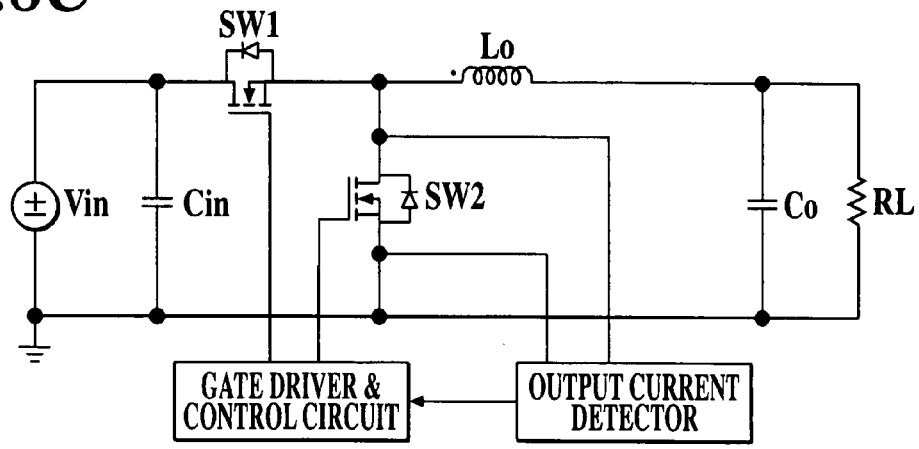

FIG. 3 is a waveform diagram showing the relationship between the driving pulse VHS of the high side switch and the output current I3, and FIGS. 4A to 4C are diagrams showing a current passage immediately after the high side switch SWH is turned on. In FIGS. 3 and 4, A show the diagrams when the output current is near to zero or is not more than zero, B show the diagrams when the output current is small, and C show the diagrams when the output current is large.

As shown in FIGS. 3A to 3C, the average current flowing through the reactor Lo is increased or reduced by changing the switching frequency to follow the variation of the output current. As shown in FIG. 4, the current flowing in the LC resonance circuit immediately after the high side switch SWH is turned on is different among a pattern A in which the output current is near to zero current or not more than zero current, a pattern B in which the output current is small and a pattern C in which the output current is large.

That is, as shown in FIG. 4A, in the pattern A in which the output current is near to zero current or not more than zero current, both the current flowing through the resonant inductor Lr and the current flowing through the reactor Lo in the opposite direction flow into the resonant capacitor Cr to promote charging of the resonant capacitor Cr when the high side switch SWH is turned on and the low side switch SWL is turned off.

Furthermore, as shown in FIG. 4B, in the pattern B in which the output current is small, the current flowing through the reactor Lo is small at the turn-on timing of the high side switch SWH, and thus the current flowing through the resonant inductor Lr directly flows into the resonant capacitor Cr, whereby the resonating operation is immediately started.

Still furthermore, as shown in FIG. 4C, in the pattern C in which the output current is large, the current flowing through the resonant inductor Lr is directly absorbed by the reactor Lo immediately after the high side switch SWH is turned on, and thus the charging to the resonant capacitor Cr is not immediately started. The charging to the resonant capacitor Cr is started when the current of the resonant inductor Lr increases and it has the same value as the current of the reactor Lo. That is, the resonating operation is started after delayed for this time period td. Furthermore, as shown in FIG. 3C, the timing at which the current of the reactor Lo turns to increase is likewise delayed by the delay time td.

FIG. 5 is a waveform diagram showing the relationship of the driving pulse VHS of the high side switch, the resonance current I1 and the voltage Vcr of the resonant capacitor. In FIG. 5, A to C are the waveform diagrams in the case of patterns A to C, respectively.

As described above, the current flowing in the LC resonance circuit varies in accordance with the magnitude of the output current I3 when the high side switch SWH is turned on, and thus the resonance current I1 and the voltage Vcr of the resonant capacitor Cr also vary in accordance with the magnitude of the output current I3 as shown in FIG. 5.

That is, in the case of the pattern A, the current flowing back from the reactor Lo when the switch SWH is turned on flows into the resonant capacitor Cr, so that the capacitor voltage Vcr has such a waveform that the voltage increasing amount of a rising edge portion is larger as compared with the normal sinusoidal shape (FIG. 5A).

Furthermore, in the case of the patter B, the resonance current I1 flows into the resonant capacitor Cr immediately after the driving pulse VHS is set to high level, and the current resonance is immediately started, so that the capacitor voltage Vcr has a substantially sinusoidal waveform (FIG. 5B).

Still furthermore, in the case of the pattern C, the start of charging of the resonant capacitor Cr is delayed due to the current absorbed by the reactor Lo, so that the overall waveform of the capacitor voltage Vcr is shifted by only the delay time td. Accordingly, with respect to the resonance current I1, the value of the oscillation center of the current is increased by the amount corresponding to the current flowing through the reactor Lo, so that the supply current is increased (FIG. 5C).

Next, a method of detecting the output current I3 on the basis of the driving pulse VHS and the capacitor voltage Vcr in the current detection circuit 20 will be described.

FIG. 6 is a waveform diagram showing a current value pulse signal Verror generated from the driving pulse VHS and the capacitor voltage Vcr. In FIG. 6, A to C are diagrams in the case of the above patterns A to C, respectively.

As shown in FIGS. 6A to 6C, the capacitor voltage detection circuit 22 (FIG. 1) of the current detection circuit 20 compares the capacitor voltage Vcr with a predetermined threshold value, and outputs a detection signal to the current value pulse generating circuit 23 when the capacitor voltage Vcr exceeds the threshold value. Here, the input voltage Vin may be used as the threshold value, for example.

The high side gate signal detection circuit 21 (FIG. 1) outputs the detection signal to the current value pulse generating circuit 23 at the timing when the driving pulse VHS of the high side switch SWH is set to high level.

As shown in FIGS. 6A to 6C, the current value pulse generating circuit 23 outputs, as a signal representing the output current amount, the current value pulse signal Verror which is set to high level from the output timing of the detection signal of the high side gate signal detection circuit 21 till the output timing of the detection signal of the capacitor voltage detection circuit 22.

As shown in FIG. 6 A, when the output current is near to zero or not more than zero, the rising edge of the capacitor voltage Vcr is sharp, and thus the current value pulse signal Verror becomes a signal having a small pulse width.

Furthermore, as shown in FIGS. 6B and 6C, when the output current I3 varies from a small value to a large value, the resonance waveform of the capacitor voltage Vcr is delayed in accordance with the output current I3, and thus the output from the capacitor voltage detecting circuit 22 is also equally delayed, so that the current value pulse signal Verror becomes a signal having a pulse width which is correlated with the output current I3. The pulse width of the current value pulse signal Verror and the output current I3 have a substantially proportional connection with each other within the range that the output current does not increase to an extremely positive or negative side.

Accordingly, the output current amount of the switching power supply circuit 11 can be detected by the thus-generated current value pulse signal Verror.

FIG. 7 is a waveform diagram showing an example of the control using the current value pulse signal Verror in the multi-phase type power supply device shown in FIG. 1.

In the multi-phase type power supply device of FIG. 1, the output current values of the respective power supply circuits 11 to 13 are detected by the current detecting circuit 20 on the basis of the detection of the ON-timing of the high side switches SWH to SWH2 of the power supply circuits 11 to 13 and the voltage detection of the resonant capacitors Cr to Cr2.

For example, when the output current of a first-phase power supply circuit 11 is equal to 10 A, the output current of a second-phase power supply circuit 12 is equal to 20 A and the output current of a third-phase power supply circuit is equal to 30 A, the current value pulse signals Verror corresponding to the output current of the respective power supply circuits 11 to 13 are input to the current comparison circuit 34 of the control block in synchronism with the synchronization signal with which the respective power supply circuits 11 to 13 execute the switching operation.

The power supply comparison circuit 34 compares the output current of the power supply circuits 11 to 13 of the respective phases with one another on the basis of the pulse widths of these current value pulse signals Verror, and outputs a signal representing the comparison result to the control circuit 32. On the basis of the comparison result, the control circuit 32 controls the power supply circuits 11 to 13 so as to reduce the output of the power supply circuit 13 having large output current and increase the output of the power supply circuit 11 having small output current, whereby the output current is balanced among the power supply circuits 11 to 13 of the respective phases.

As described above, according to the power supply device 100 of this embodiment, in the current resonance type switching power supply circuits 11 to 13, the output current of each of the respective power supply circuits 11 to 13 can be accurately detected by only a simple analog circuit such as a comparator or the like and a logic circuit without adding detecting circuit elements such as a resistor, a coil, etc. Furthermore, temperature compensation is not required, and accurate detection can be performed irrespective of the circuit temperature.

In the multi-phase type power supply device 100 adopting the current resonance type switching power supply circuit, the operation of the respective power supply circuits 11 to 13 can be controlled on the basis of the detection of the output current as described above so that the outputs of the respective power supply circuits 11 to 13 are averaged.

The present invention is not limited to the above-described embodiment, and various modifications may be made to the embodiment. For example, in the above embodiment, the present invention is applied to the step-down type current resonance switching power supply circuit. However, the present invention may be also applied to a step-up type or step-up/down type current resonance switching power supply circuit. Furthermore, the portion of the reactor Lo may be replaced by a transformer to establish an insulation type power supply circuit. The switching element is not limited to MOSFET, and various kinds of transistors may be applied.

Furthermore, in the above embodiment, the output current of each power supply circuit is adjusted by slightly shifting the switching period of the power supply circuit on the basis of the detection of the output current. However, the switching control in a current mode may be performed on the basis of the detection of the output current or protection control to short-circuiting of the output terminal or overcurrent may be performed on the basis of the detection of the output current.

Still furthermore, in the above embodiment, the output of the gate driver is monitored to detect the operation timing of the switching element. However, the detection of the operation timing may be performed by any method, for example, the operation timing may be detected on the basis of the output of an oscillation circuit for generating switching timing or the like. Furthermore, the setting of the detection point of the capacitor voltage and the threshold value of the detection voltage may be properly changed in accordance with the construction of the LC resonance circuit or the connection style.

According to a first aspect of the preferred embodiments of the present invention, there is provided a current resonance type switching power supply circuit (11) including the switching element (SWH: FIG. 2) and the LC resonance circuit (Lr, Cr) to resonate current flowing through the switching element, and it further comprises the detection circuit (20) to detect the output current amount on the basis of the operation timing of the switching element (SWH) and the voltage under the resonating operation of the LC resonance circuit.

By such means, in the current resonance type switching power supply circuit, the output current can be detected accurately and easily without adding any circuit element such as a resistor or the like in the power supply circuit. Specifically, in the current resonance type switching power supply circuit, if the current (13) of the output inductor (reactor Lo) is large when the switching element (SWH) is turned on and the current flowing through the switching element increases, all the current flowing through the switching element (SWH) flows to the reactor (Lo) side and thus the charging of the resonant capacitor (Cr) is not started. The charting of the resonance capacitor (Cr) is started at the time when the current (11) flowing through the switching element (SWH) is equal to the same value as the output current (13). That is, the start timing of the resonating operation of the LC resonance circuit (Lr, Cr) is delayed in accordance with the magnitude of the output current (13). Accordingly, the delay time concerned can be detected on the basis of the operation timing of the switching element (SWH) and the voltage under the resonating operation of the LC resonance circuit and converted to the output current amount. Furthermore, the relationship between the output current value concerned and the delay time of the resonating operation is hardly dependent on the temperature, so that temperature compensation is not required and the accurate output current detection can be performed at all times.

Specifically, the detection circuit (20) may be configured so as to detect the time length from the ON-timing of the switching element (SWH) till the time when the capacitor voltage (Vcr) of the LC resonance circuit reaches a predetermined voltage. Furthermore, the DC input voltage (Vin) may be applied as the predetermined voltage.

By the above construction, the output current can be detected by only a simple analog circuit such as a comparator or the like and a logic circuit with providing neither a special analog circuit for current detection nor a circuit for generating a reference voltage.

Furthermore, the output of the detection circuit (20) may be supplied as one of feedback signals to the control circuit and used to control the operation of the switching element. That is, the period of turning on the switching element (SWH) is controlled on the basis of the output of the detection circuit (20), or it may be used to control the switching element (SWH) in the current mode. In addition, it may be used to control the overcurrent protection of the output current (13).

Specifically, the LC resonance circuit comprises a resonance inductor (Lr) connected in series to the switching element (SWH) and a resonance capacitor (Cr) to be charged with current flowing through the inductor (Lr).

Furthermore, specifically, the power supply circuit (11) may comprise a reactor (Lo) to receive an input voltage and accumulate power by the ON-operation of the switching element (SWH), and a rectifying circuit (SWL) to supply current to the reactor (Lo) during the period when the switching element (SWH) is turned off, and be configured so that the output current (13) is output by the power accumulated in the reactor (Lo).

In the foregoing description, reference numerals representing the corresponding relationship with the embodiment are represented by using parentheses, however, the present invention is not limited to this corresponding relationship.

According to this invention, it is unnecessary to provide an element for current detection such as a detecting resistor or the like in the current resonance type switching power supply circuit, and accurate output current can be detected by only simple voltage detection and a logic circuit.

Furthermore, by the detection of the output current as described above, various kinds of control based on the output current can be executed in the current resonance type switching power supply circuit without reducing the power conversion efficiency and increasing the manufacturing cost.

The entire disclosure of Japanese Patent Application No. 2006-322823 filed on Nov. 30, 2006, including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A switching power supply circuit of current resonance type comprising:
  a switching element;
  an LC resonance circuit to resonate current flowing through the switching element; and a detection circuit to perform a detection associated with an output current amount of the switching power supply circuit;

wherein the detection circuit comprises:

an operation detection circuit to detect an operating timing of the switching element;

a voltage detection circuit to detect a voltage under resonating operation of the LC resonance circuit; and a current value pulse generating circuit to generate a current value pulse, which becomes high during a time from when a detection signal of the operation detection circuit is output until a time when a detection signal of the voltage detection circuit is output, and to output the current value pulse as the output current amount.

2. The switching power supply circuit according to claim 1, wherein the current value pulse has a pulse width depending on a delay time of the resonating operation of the LC resonance circuit with respect to an ON-timing of the switching element.

3. The switching power supply circuit according to claim 1, wherein the current value pulse has a pulse width depending on a length of time between an ON-timing of the switching element and a time when a capacitor voltage of the LC resonance circuit reaches a predetermined voltage.

4. The switching power supply circuit according to claim 3, wherein a DC voltage is input to the switching power supply circuit, and the DC voltage is applied as the predetermined voltage.

5. The switching power supply circuit according to claim 1, wherein the LC resonance circuit comprises a resonant inductor connected in series to the switching element, and a resonant capacitor to be charged with current flowing through the resonant inductor.

6. The switching power supply circuit according to claim 1, further comprising a control circuit to control the operation of the switching element, wherein an output of the detection circuit is included in a feed-back signal of the control circuit.

7. The switching power supply circuit according to claim 6, wherein the control circuit changes an operating frequency of the switching element based on the output of the detection circuit.

8. The switching power supply circuit according to claim 6, wherein the control circuit controls the switching element in a current mode based on the output of the detection circuit.

9. The switching power supply circuit according to claim 1, further comprising an overcurrent protection circuit to protect the switching power supply circuit against overcurrent of the output current based on the output of the detection circuit.

10. The switching power supply circuit according to claim 1, further comprising a reactor to receive an input voltage by ON-operation of the switching element and to accumulate power, and a rectifying circuit to supply current to the reactor during OFF-period of the switching element, wherein output current is supplied by the power accumulated in the reactor.

11. A power supply device comprising:

a plurality of switching power supply circuits each according to claim 1, said switching power supply circuits being connected in parallel to one another; and a control circuit to control operations of respective switching elements based on outputs of respective detection circuits so that output currents of said switching power supply circuits become uniform.

* * * * *